United States Patent
King

[11] 3,932,949
[45] Jan. 20, 1976

[54] METHOD FOR DEMONSTRATING OPTICAL ABERRATION FORMATION

[76] Inventor: Hugh R. King, 1075 First Ave., New York, N.Y. 10022

[22] Filed: Feb. 20, 1974

[21] Appl. No.: 444,111

[52] U.S. Cl. .................................. 35/19 B; 350/206
[51] Int. Cl. ........................................... G09b 23/22
[58] Field of Search ............. 35/19 B; 350/167, 206, 350/245, 271

[56] References Cited
UNITED STATES PATENTS

| | | | |
|---|---|---|---|
| 2,529,107 | 11/1950 | Shapiro | 35/19 B |
| 2,881,536 | 4/1959 | Sprecher | 35/19 B |
| 3,094,790 | 6/1963 | Scidmore | 35/19 B |
| 3,185,021 | 5/1965 | Thompson | 350/206 X |
| 3,752,555 | 8/1973 | Klotz | 350/167 X |

*Primary Examiner*—Harland S. Skogquist

[57] ABSTRACT

A method for the visual demonstration of the formation and causes of the five Seidel aberrations and chromatism appearing on the image plane of a converging lens system. A method and device utilizing that method are provided for the refraction through a lens system of multiple pinhole images of a single object such as to visually demonstrate: (a) the respective distortions of each of said images on a movable ground-glass after they have passed through different portions of the system but prior to the system's image plane; (b) the convergence, in cinematographic-like progression on the moving ground-glass, of these multiple refracted images to and superimposition at the system's focal plane and their respective contribution to the abberrations in the composite image observed on that plane; (c) the further asymmetrical convergence or collapse of the discrete refracted images beyond the focal plane to their respective "image-apertures", said image-apertures defining the image plane of the physical pinhole apertures; (d) the visual "sommersault", as seen on the moving ground-glass, of the collapsing images whereby they appear to "squeeze" through and reverse themselves in passing through the said image-apertures; (e) the visual and readily apparent aberrations caused by the aforesaid "sommersault" when it appears near the system's image plane. A ground-glass "sandwich" comprised of two or more lightly etched glass plates is provided whereby the characteristic horizontal and vertical bright-line images of astigmatism may be simultaneously observed in the process of formation and whereby the full nature of the so-called "circle of least confusion" in optical theory may be visually shown for the first time. A changeable lens system is provided whereby the affect of the multiple bending of images in correcting projected image distortions and aberrations can be visually demonstrated in process.

8 Claims, 4 Drawing Figures

METHOD FOR DEMONSTRATING OPTICAL ABERRATION FORMATION

FIELD OF THE INVENTION

This invention relates to the general area of lens aberration demonstration in optical phenomena, in particular to a method and device for the visual demonstration of the formation and source of the five Seidel aberrations and chromatism in optical theory.

DESCRIPTION OF THE PRIOR ART

Current methods for the visual study and demonstration of the causes of the aberrations found in the focal image formed by a lens system involve primarily the projections of narrow and/or intense pencils of light, such as those provided by a laser beam, through a given lens or refractive system. All such methods have logically derived from the principles of Geometrical Optics whereby a point of light may be mathematically traced through space, the starting position being called a "point-source", the plotted track or route it takes called a "ray", and the curvature of the ray depending upon the refractive and/or reflective indices of the media the light encounters on its journey. When multiple points of light originating from a common point-source are so refracted by a lens system as to meet or superimpose in a common point on the focal plane of the system, then a perfect "image" of the point-source is created. If this could be achieved in proper spatial order and relationship by all the point-sources sending out rays from a given object plane, then a theoretically perfect image of said plane would be created on the system's focal plane. Following such principles, current methods for the demonstration and visual explanation of the causes of imperfect images, or aberrations, on a lens system's focal plane have attempted to simulate the mathematical "ray" of geometrical optics by tracing narrow beams of light (such as that provided by the laser) as they are refracted through various areas of the lens system. Such methods, however, have proved only partially satisfactory in the demonstration of so-called Spherical Aberration; and the more complex aberrations of Coma, Astigmatism, Distortion, and the Petzval Curvature, as well as certain complexities in Chromatism, have been left to the verbal and often varying visualizations of their mathematical analyses and formulae.

Whereas traditional and current methods for demonstrating optical aberrations have attempted to simulate mathematical ray tracings, the subject invention novelly provides a method for utilizing the primitive pinhole image, whose formation as a discrete and resolved image is not dependent upon prior lens refraction but whose distortion during and after lens refraction can be progressively studied so as to visually trace the cause and development, in process, of complex aberrations heretofore observed only in their appearance at the focal plane. Because the formation of the primitive pinhole image is ultimately inexplicable by the principles of either refraction or diffraction it has been largely neglected in the literature of optical theory. The Applicant's discovery, that multiple pinhole images of a single object created simultaneously by multiple pinhole apertures superimpose at the focal plane of a converging lens system, underlies the method and device of this invention for visually studying the refractive processes that lead to aberrations on the image plane.

SUMMARY OF THE INVENTION

It is an object of this invention to provide a method and device whereby a teacher or student of optics can visually observe and demonstrate the gradual distortion in process of a refracted image as it emerges through a lens system, the approach of that image to and appearance at the system's focal plane, and the relevant nature of the refracted image beyond the focal plane.

It is another object of this invention to provide a method and device for the refraction through a lens system of multiple pinhole images of a single light source or object such as to visually demonstrate: (a) the respective distortions of each of said images on a screen or ground-glass after they have passed through different portions of the system but prior to the system's focal plane; (b) the convergence of these multiple refracted images, in cinematographic-like progression, to and superimposition at the system's focal plane and their respective contribution to the aberrations in the composite image observed on that plane; (c) the further asymmetrical convergence or collapse of the separate refracted images beyond the focal plane to their respective "image-apertures", said image-apertures defining the image plane of the physical pinhole apertures; (d) the visual half-"sommersault", as seen on a moving ground-glass, of the collapsing images whereby they appear to "squeeze" through and reverse themselves in passing through the said image-apertures; (e) the visual and readily apparent affect of the aforesaid "sommersault" when it appears near the general focal plane of the lens system.

It is another object of this invention to provide a method for visually demonstrating that the aberration known in optical theory as "Coma" is formed by the premature collapsing of those image elements passing through the lens system at oblique angles so as to pass through the said "sommersault" when it appears near or on the system's focal plane.

It is another object of this invention to provide a method and device for visually tracing the causes of the aberrations known as Astigmatism by utilizing a novel ground-glass "sandwich" comprised of two or more lightly etched glass plates whereby the characteristic horizontal and vertical brightline images of astigmatism may be observed simultaneously in the process of formation, and further, to show visually for the first time the full nature of the so-called "circle of least confusion" in astigmatism. It is another object of this invention to provide a method for visually demonstrating the causes and formation of the aberration known as "Distortion" as well as to visually demonstrate the ultimate irreducibility of the aberration known as the "Petzval Curvature".

It is another object of this invention to provide a method for more graphically demonstrating the complexities of Chromatism when it accompanies each of the aforesaid aberrations in an uncorrected lens system.

It is another object of this invention to provide a method and device for visually demonstrating the affect of corrected or partially corrected lens systems on the formation and behaviour of refracted images as they emerge from the lens surface and finally squeeze through the aforesaid image-apertures.

It is another object of this invention to provide a novel method for the visual study of all optical refraction phenomena without any sophisticated knowledge of optical theory or mathematics.

These and other objects will be better comprehended after reference to the following description and accompanying drawings setting forth both the principles of the method invention and one embodiment of an optical device designed to utilize those principles.

DESCRIPTION OF THE PREFERRED METHOD EMBODIMENT

Figure 1:
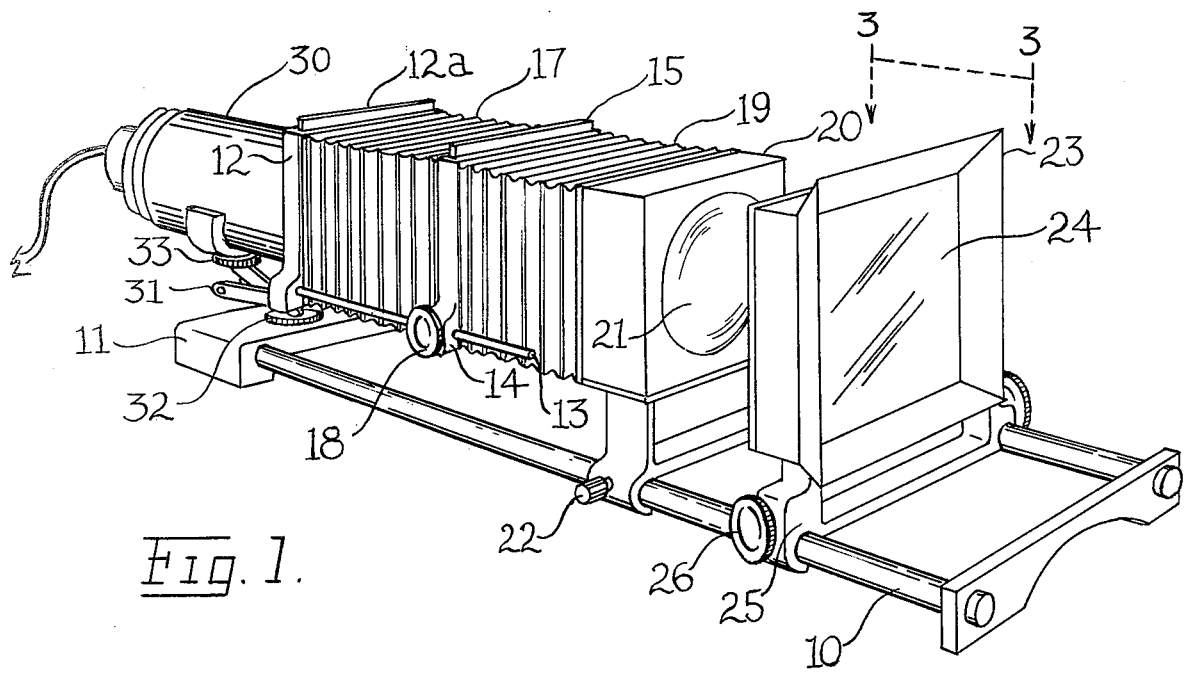
FIG. 1 is a perspective view of an optical device designed to utlize and illustrate the novel method of the subject invention in lens aberration demonstration.

Referring to FIG. 1 designates an optical bench 10 of the general configuration and materials common to laboratory work comprised of two parallel bars supported on either end so as to provide a track for the placement, alignment, and smooth movement of optical lenses and equipment. On one end of said optical bench 10 an illuminator 30 of standard laboratory design is affixed to the supporting base 11 by means of an articulated arm 31, said arm 31 attached to said base 11 by means of a standard swivel 32 and to said illuminator 30 by means of a standard head-swivel 33, such as to provide that illuminator 30 can be moved through any circular arc where the radius of said arc is the axis of the cylinder of illuminator 30 and the center of curvature is located in lens housing 20.

A slide housing 12 capable of receiving standard photographic transparencies is affixed directly to the front of illuminator 30 such as to provide an intense image transmitted through said transparency when said illuminator 30 is turned on. Rod 13, affixed to the base of either side of slide housing 12, provides a support and track for pinhole housing 14, said housing 14 designed to receive an opaque plate 15 perforated with one or more pinhole apertures of the size and placement determined by the experiment. Said pinhole housing 14 is moved along the track provided by rod 13 by means of a standard friction wheel attached to and turned by adjustment wheel 18. A light-restricting bellows 17, common to photographic equipment, is attached at one end to the front edge of slide housing 12 and at the other end to the rear edge of pinhole housing 14. One end of a second light-restricting bellows 19 is attached to the front edge of pinhole housing 14, the other end of said bellows 19 attached to the rear edge of lens housing 20. Lens housing 20 is so designed as to be supported by and to move upon the optical bench 10, said lens housing 20 being capable of being temporarily affixed to said bench 10 by means of set-screw 22.

A ground-glass housing 23 is so designed as to be supported by and to move upon the optical bench 10 such as to receive upon ground-glass 24 any and all images transmitted by lens 21. Smooth movement of ground-glass housing 23 along the bench 10 is afforded by a standard friction wheel enclosed in the housing base 25 and attached to and controlled by the large adjustment wheel 26.

Figure 2:
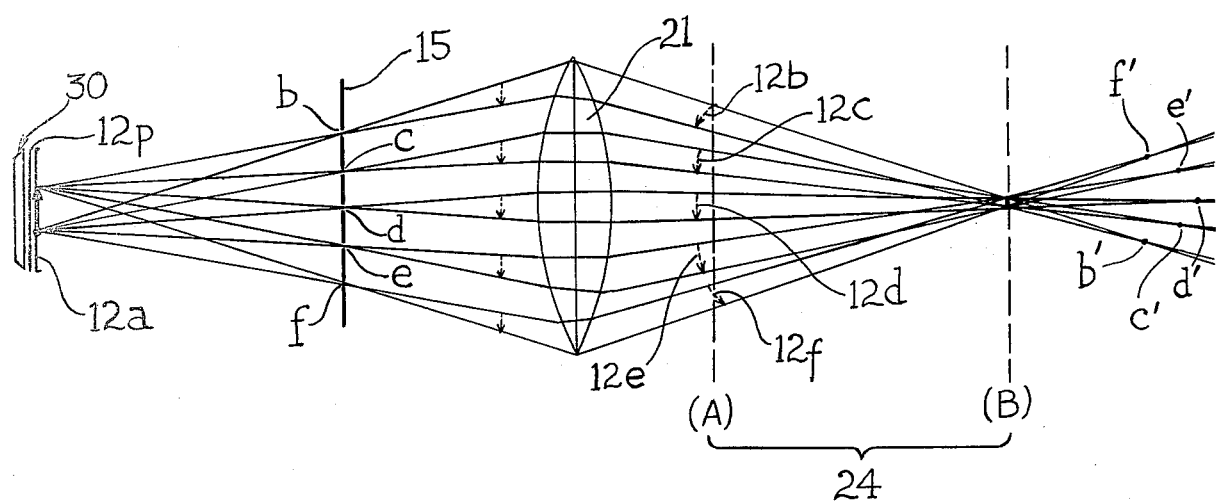
FIG. 2 is a diagrammatic illustration of the basic principles and method of operation of any optics demonstration device made in accordance with the subject invention.

Referring now to FIG. 2, there is given a diagrammatic illustration of the principle and method of operation of the optics demonstration device described in FIG. 1.

The image on photographic slide 12a is brightly illuminated by illuminator 30 such that said image is projected through each of the pinholes $b, c, d, e$ & $f$ in plate 15, and such that the lens 21 receives and refracts discrete and separate duplicate images 12b, 12c, 12d, 12e, & 12f of said slide image 12a in the number and placement determined by the number and placement of said pinholes in plate 15. It is advisable to place a translucent light-diffusing plate 12p between illuminator 30 and said slide 24a, otherwise an image of the lamp and interior of illuminator 30 will be projected along with said image of slide 12a. Ground-glass 24 in position (A) thus receives and visually captures the images 12b, 12c, 12d, 12e & 12f albeit in varying degrees of distortion according to the respective portion of lens 21 through which each has passed. As ground-glass 24 is slowly moved back to position (B), each of images 12b, 12c, 12d, 12e, & 12f contract and deteriorate in quality, all as a group converging and finally superimposing at said position (B), which position defines the optical focal plane of the slide 12a. As ground-glass 24 is moved further back, images 12b, 12c, 12d, 12e, & 12f will be seen to separate again and diverge from each other on ground-glass 24 but each individually contracting or converging to visual points indicated in FIG. 2 respectively as $b', c', d', e', f'$. Said visual points may be optically determined as the focal images of pinhole apertures $b, c, d, e,$ & $f$ on plate 15; however, these aperture images $b', c', d', e',$ & $f'$ will be seen to appear on ground glass 24 at varying distances behind the superimposition focal position (B) of ground-glass 24. If ground-glass 24 is now moved even further back, images 12b, 12c, 12d, 12e, & 12f will appear to emerge again through their respective image-apertures $b', c', d', e',$ & $f'$, albeit in a reverse, now erect position, each image now expanding (diverging) and all images now diverging from each other.

By using this invention to visually study the varying convergence and collapse of images 12b, 12c, 12d, 12e & 12f as they appear in cinematographic progression on the moving ground-glass 24, it is possible for the experimenter to dramatically demonstrate for the first time the origin, nature, and relationship of all five Seidel aberrations and chromatism in optical theory.

If the central pinhole images 12c, 12d, & 12e are suppressed by shuttering their respective apertues $c, d,$ & $e$ on pinhole plate 15, it will be seen that the superimposition focal plane of the more peripheral images 12b and 12f is clearest at a position of ground-glass 24 forward of position (B), thus illustrating Spherical Aberration, where the rays passing through the periphery of a lens come to a focus prior to the focus of more central or axial rays. However, the subject invention further demonstrates that the premature focal image, or early superimposition, of peripheral images 12b and 12f is itself substantially inferior in quality to the focal image, or superimposition of the more central images 12c, 12d, & 12e. By observing the cinematographic progression of all the images on the ground-glass 24 it can be shown that said inferiority and premature focussing of peripherial images 12b and 12f is caused by the non-symmetrical and excessive concave curvature imposed on images 12b and 12f by the periphery of the uncorrected lens 21, causing images 12b and 12f, as they appear on the moving ground-glass 24, to visually "sommersault" as they converge toward and squeeze through imageapertures b' and f', reversing themselves in the process. By a proper adjustment of the subject invention, as will be described below, so that the projected pinhole images strike the lens 21 as sharply oblique angles, it can be further demonstrated that the refracted image following said oblique angle projection will converge so asymmetrically and prematurely as to make said visual "sommersault" take place near the superimposition focal plane or position (B) of ground-glass 24, creating the characteristic optical "tail" known in theory as "Coma". The subject invention allows a thorough visual study of the precise origin, nature, and correction of the various manifestations of the Coma aberration as well as its relation to all other optical aberrations, without any knowledge of the complexity of mathematics and trigonometrical ray tracing that has heretofore necessarily surrounded this phenomenon.

Figure 3:
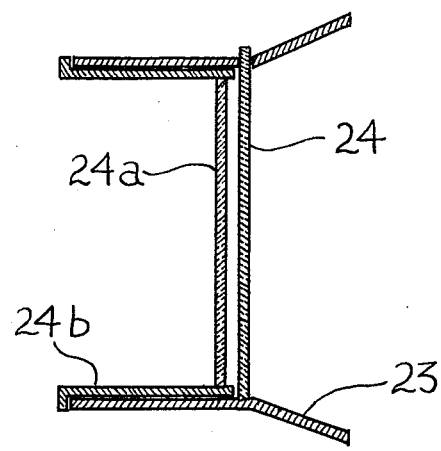
FIG. 3 is a longitudinal section of the ground-glass housing element of the demonstration device shown in FIG. 1 taken substantially along the line 3—3.

Reference is now made to FIG. 3 showing a longitudinal crosssection of the ground-glass housing 23 in one embodiment using this invention. In the description hereinbefore given reference has been made to a single ground-glass sheet 24; however, FIG. 3 illustrates that ground-glass housing 23 is so designed as to permit the insertion and movement in telescopic fashion of a second ground-glass sheet 24a affixed to removable inner housing 24b. Said ground-glass 24a is only lightly etched, sufficient to reflect a weak image but so as also to allow free light transmission to ground-glass 24. The purpose of the thus constructed ground-glass "sandwich" comprised of ground-glasses 24 and 24a is to provide means for observing simultaneously the nature of the refracted pinhole image at two distances from the refracting lens 21. Careful observation will distinguish between the reflected image on ground-glass 24a as transmitted through glass 24 and the reflected image from glass 24. When said ground-glass "sandwich" is properly adjusted and moved back and forth near the focal plane of lens 21, then the formation of the phenomenon of Astigmatism can be dramatically demonstrated and visually explained. By the movement of illuminator 30 shown in FIGS. 1 and 2 such that its cylinder axis is displaced from coincidence with the optic axis of lens 21, a pinhole image can be projected through a peripheral aperture in pinhole plate 15 such that said image strikes the periphery of lens 21 at a strongly oblique angle, the vertical component of said oblique angle with the plane of lens 21 made greater in degrees for purposes of this demonstration than the horizontal component. Accordingly, after refraction by lens 21, the said vertical component of said oblique angle projection will converge or go through the aforesaid visual "sommersault" more rapidly on the ground-glass than the said horizontal component of the same image. By a proper adjustment and movement of the aforesaid ground-glass "sandwich" comprised of ground-glasses 24 and 24a, a position can be found where the said vertical component has contracted to a point on ground-glass 24a while the said horizontal component is still in process of converging and thus is of finite size as it appears on glass 24a, and where simultaneously the said horizontal component has converged to a point on ground-glass 24 while the reversed and now diverging vertical component appears on glass 24. Observation of the ground-glass "sandwich" thus reveals a bright horizontal "line" image forming on ground-glass 24a and a bright vertical "line" image forming on ground-glass 24 characteristic of the optical aberration, Astigmatism. By moving the ground-glass housing 23 back and forth in the aforesaid determined area, it can be graphically shown that the so-called "circle of least confusion" in traditional analyses of astigmatism is in fact a position between the vertical and horizontal line images where, in this example, the vertical component is emerging through its image-aperture and is now diverging, albeit in a reversed and less intense form, and the horizontal component is still in the final stages of convergence to its image-aperture.

By varying the distance between the slide housing 12 and the pinhole plate housing 14, between plate housing 14 and the lens housing 20, and between the housing 20 and the ground-glass housing 23, all the principle phenomena of geometrical optics can be demonstrated and explained in a visual manner and with a clarity heretofore not available. For example, if the pinhole housing 14 is so adjusted as to be positioned at a distance from lens 21 less than the focal length of lens 21, then the refracted pinhole images, such as 12b or 12c, will emerge with a convex curvature and thus diverge or expand while their respective paths still converge to a focal plane of superimposition; whereas, if both the slide housing 12 and the pinhole plate 15 are positioned at a distance from lens 21 less than the focal length of lens 21, then the refracted pinhole images will both expand or diverge individually and take paths that diverge from each other, so that no superimposition takes place and thus there can be no focal plane or image.

Figure 4:
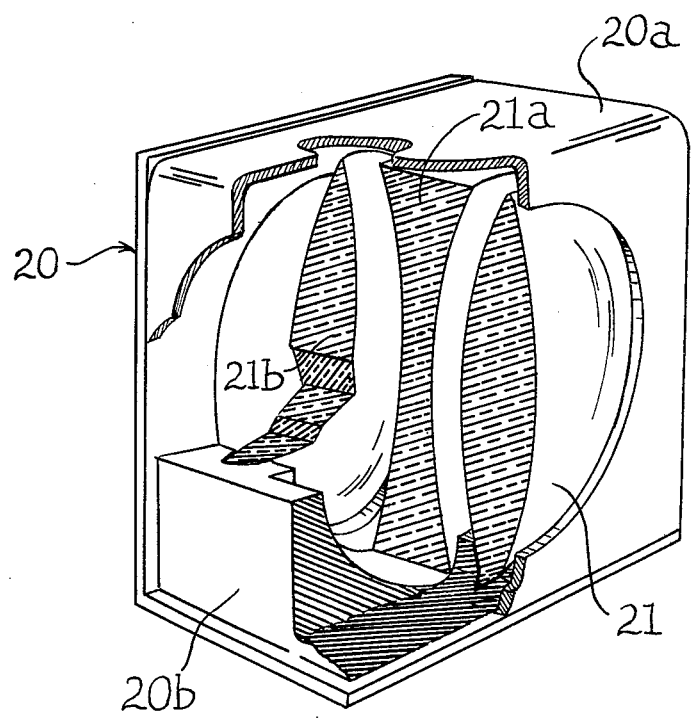
FIG. 4 is a perspective, cut-a-way view of the lens housing element of the demonstration device shown in FIG. 1.

Reference to FIG. 4 shows a cut-a-way perspective view of the lens housing 20 in one embodiment using this invention. In the description hereinbefore given, reference has been made to a single, uncorrected lens 21; however, FIG. 4 illustrates that lens housing 20 is so designed as to permit the insertion or removal of additional lenses 21a and 21b. For this purpose, the housing cover 20a is removable to provide access to lenses 21, 21a, and 21b, said lenses held in temporary position by the slotted cradle 20b. Lens housing 20 is thus designed so as to permit the insertion of correcting lens elements for the purpose of demonstrating the affect of the multiple bending of images in correcting projected image distortion and focal plane aberrations. The housing 20 also allows the visual study of the affects on image resolution of the bending of single refracting lenses.

In addition the said lens housing 20 provides the possiblity of the insertion of various size aperture plates both before and after a lens to study the affect of aperture restriction on image fidelity.

By use of the subject invention, a demonstration of the full nature of the "Distortion" aberration can be made for the first time, visually illustrating that so-called "barrel" and "pincushion" distortions are caused by the curvature of the lens' surfaces, not, as in other aberrations, by the velocity of light through the varying thickness of the lens itself; however, the curvature of the refracted image resulting from lens thickness causes the barrel distortion, as observed by means of the subject invention, to be self-correcting and, in certain cases, to over-correct, causing a "pincushion" aberration even in the use of a converging lens system, a demonstrable effect contrary to most optical literature. Further, experimentation with the subject invention involving corrected lens systems demonstrates the ultimate irreduciblity of the curvature of any image plane, demonstrating the so-called Petzval aberration. Finally, the complexities of Chromatism in each of the aforedescribed aberrations can be studied in process of development, showing the anomalous reversal of the spectrum when the refracted images passes through the aforedescribed image-aperture, or said "sommersault", at or around the image plane.

Although the above description is directed to a preferred procedure and embodiment of the subject invention, it is noted that other variations and modifications in both the method and device utilizing the said method will be readily apparent to those skilled in the art and, therefore, may be made without departing from the spirit and scope of the invention.

What is claimed is:

1. A method for the visual demonstration of the process of the formation of image aberrations and their causes as created by optical lens refraction, comprising the steps of:
   a. illuminating a given object by means of an illuminator so that said object projects an intense image by either incident or transmitted light;
   b. aligning said illuminated object with an opaque plate perforated with multiple pinhole apertures so as to project said intense image upon and through said pinhole apertures so as to create multiple pinhole images of said intense image;
   c. aligning said opaque plate with an optical lens system so as to project said multiple pinhole images upon and through said lens system;
   d. aligning said lens system with a movable means of directly observing the characteristics and behaviour of said pinhole images after they have passed through and been refracted by said lens system and at any given distance from said system.
   e. moving said movable means of observing the behaviour of said refracted pinhole images back and forth through the image plane of said lens system so as to visually demonstrate the processes which cause the formation of varying optical aberrations observed when said refracted pinhole images superimpose at said image plane.

2. A method for the visual demonstration of optical image aberrations as in claim 1 wherein said movable means of observing said refracted pinhole images is either an optical ground-glass or similar reflecting screen.

3. A method for the visual demonstration of optical image aberrations as in claim 1 wherein said movable means of observing said refracted pinhole images is another optical system.

4. A method for the visual demonstration of optical image aberration as in claim 1 wherein the elements of said lens system may be added to or replaced by lens elements of different curvature so as to visually demonstrate the corresponding changes of curvature and symmetry in the said refracted pinhole images.

5. A method for the visual demonstration of optical image aberration as in claim 1 wherein the said movable means of observing said refracted pinhole images is comprised of two or more lightly etched parallel glass plates so spaced as to each simultaneously reflect for visual obervation the said refracted pinhole images at each of said glass plates' respective distances from said lens system.

6. A method for the visual demonstration of optical image aberration as in claim 1 wherein said illuminator, said opaque pinhole aperture plate, said lens system and said means of observing the behaviour of said refracted pinhole images, are all mounted on an optical bench whereby each may be securely aligned with and moved in relative position to one another.

7. A method for the visual demonstration of optical image aberration as in claim 1 wherein said illuminator and said opaque pinhole aperture plate are so supported on articulated mounts as to provide for the projection of said pinhole images at various angles to the plane of any element of the said lens system.

8. An optical demonstration device designed in accordance with and for the purpose of utilizing the method for visually demonstrating optical aberration formation as set forth in claim 1.

* * * * *